United States Patent
Arndt et al.

(10) Patent No.: US 7,291,088 B2
(45) Date of Patent: Nov. 6, 2007

(54) METHOD FOR EFFECTING LOW-LOSS TORQUE TRANSMISSION IN PLANETARY GEARS

(76) Inventors: Joachim Arndt, Wartberghöhe 2, Traunstein (DE) D-83278; Maximilian Simon, Blumenstrasse 14, Olching (DE) D-82140; Herbert Vojacek, Georg-Stöger-Strasse 21, Gmund am Tegernsee (DE) D-83703

( * ) Notice: Subject to any disclaimer, the term of this patent is extended or adjusted under 35 U.S.C. 154(b) by 137 days.

(21) Appl. No.: 10/536,581

(22) PCT Filed: Nov. 20, 2003

(86) PCT No.: PCT/EP03/13011

§ 371 (c)(1),
(2), (4) Date: Aug. 22, 2005

(87) PCT Pub. No.: WO2004/048805

PCT Pub. Date: Jun. 10, 2004

(65) Prior Publication Data

US 2006/0205557 A1    Sep. 14, 2006

(30) Foreign Application Priority Data

Nov. 22, 2002 (DE) ................................ 102 54 527

(51) Int. Cl.
*F16H 1/34* (2006.01)
(52) U.S. Cl. ........................................ 475/331; 475/344
(58) Field of Classification Search ................ 475/338
See application file for complete search history.

(56) References Cited

U.S. PATENT DOCUMENTS

| 3,178,987 | A | | 4/1965 | Reese et al. |
| 3,245,279 | A | * | 4/1966 | Baker ........................... 74/410 |
| 3,307,433 | A | * | 3/1967 | Bennett et al. ............. 475/342 |
| 3,545,296 | A | * | 12/1970 | Eggins ......................... 74/410 |
| 3,636,789 | A | * | 1/1972 | Geiger ......................... 74/409 |
| 5,085,093 | A | | 2/1992 | Heidrich |
| 6,189,397 | B1 | * | 2/2001 | Morrow et al. ............... 74/410 |
| 6,420,808 | B1 | | 7/2002 | Hösle |

FOREIGN PATENT DOCUMENTS

| DE | 1 149 958 | 6/1963 |
| DE | 2 029 371 | 1/1971 |
| DE | 39 23 430 C2 | 1/1991 |
| DE | 40 17 226 A1 | 12/1991 |
| DE | 195 12 980 A1 | 10/1996 |
| DE | 196 24 083 A1 | 1/1998 |
| DE | 199 17 605 A1 | 1/2001 |
| DE | 199 61 695 A1 | 6/2001 |
| GB | 662905 | 12/1951 |
| GB | 897066 | 5/1962 |
| GB | 1 310 417 | 3/1973 |

* cited by examiner

*Primary Examiner*—Sherry Estremsky
*Assistant Examiner*—Edwin A Young
(74) *Attorney, Agent, or Firm*—Laurence A. Greenberg; Werner H. Stemer; Ralph E. Locher

(57) ABSTRACT

The invention relates to a method for effecting torque transmission in a single-stage planetary gear comprising 2-6 planet units. The arrangement and the interaction of individual gear elements in conjunction with a method for mounting and adjusting them result in a torque transmission with uniform load distribution to the individual planet units.

13 Claims, 1 Drawing Sheet

METHOD FOR EFFECTING LOW-LOSS TORQUE TRANSMISSION IN PLANETARY GEARS

BACKGROUND OF THE INVENTION

Field of the Invention

The invention relates to a method for the low-loss and low-noise transfer of a torque, introduced into a transmission at low rotational speed via an input shaft, to an output shaft of comparatively high rotational speed in a single-stage epicyclic transmission having a plurality of planetary units.

Mechanical transmissions serve for transferring a torque introduced via a drive shaft to an output shaft in as loss-free, operationally reliable and cost-efficient a manner as possible in fulfillment of various boundary conditions. Predetermined boundary conditions relate to the construction dimensions or the available space provision, the magnitude of the torque to be transferred, the predetermined shaft rotational speeds during input and output, but also the degree of lack of noise, of operational reliability and of uniform utilization, and the design requirements for simple assembly and maintenance of the transmission.

Power losses in slow-running transmissions are predominantly frictional losses caused by axial and/or radial forces between meshing gearwheels and at shaft bearings.

In line with the importance of this, therefore, a multiplicity of proposals for minimizing torque losses in transmissions are known, the boundary conditions which were referred to above and have to be taken into account making it necessary to reach compromises.

Transmission gearwheels are designed with a straight or a helical toothing. To compensate axial forces and to minimize power losses in bearings, helical toothings are designed as double or herringbone toothings, that is to say a gearwheel or a gearwheel unit has two beveled tooth halves contiguous to one another or two half wheels forming a unit and beveled correspondingly in the toothed region.

A specific group of transmissions comprises stepped planets. These are understood to mean transmissions with one planetary unit or, for the purpose of torque distribution or load distribution, preferably a plurality of planetary units which rotate about their own planet shaft and which, if appropriate, additionally orbit around the shaft of a transmission component central to the planetary unit with a sun pinion (stationary transmission/planetary transmission). The planetary unit always co-operates, in the transmission, with a torque-input and a torque-output transmission component, for example with a ringwheel and with a sun pinion. Two gearwheels or gearwheel units having different numbers of teeth are arranged on the shaft of a planetary unit so as to be spaced apart from one another and fixedly in terms of rotation with respect to one another. Stepped epicyclic transmissions make it possible to have a higher ratio in a transmission step than epicyclic transmissions with single planets. They also have fewer parts than genuine two-stage epicyclic transmissions and are therefore used. For a compact type of construction, the epicyclic transmissions are conventionally designed with a power split.

In the case of stringent requirements regarding the quiet running of stepped epicyclic transmissions, the teeth of the gearwheels are often designed with a helical toothing. Simple helical toothings lead, during torque transfer, to undesirable axial forces between the meshing gearwheels. As a countermeasure, it is known, by the choice of the helics direction and the size of the helics angle of two planetary gearwheels seated on a planet shaft for load input and load output, to compensate the axial forces occurring and consequently to keep the resultant axial force of a planetary unit as low as possible. Axial forces and tilting moments not compensated in a planetary unit have to be absorbed in the shaft bearings of the planetary unit.

During the co-operation of helically toothed planetary units with a drive or output component of the transmission, considerable axial forces are always transferred to these, particularly also in situations close to practice where two or more planetary units are used for the power split. Furthermore in the mounting of rapidly rotating transmission components, for example the output component with a sun pinion which, moreover, mostly also is designed to be freely adjustable radially, high axial forces require a considerable structural outlay in terms of bearing size and bearing design for absorbing the axial forces. The result is undesirable power losses in the bearings.

In the individual planetary units within a stepped planet set, it is necessary, for uniform load distribution to the individual planetary units, with axial forces at the same time being compensated, to have a highly accurate co-ordination of the angular positions (tooth helics, angular position on planet shaft) of the individual gearwheels. This requires a considerable outlay in terms of manufacture and/or of assembly. Moreover, for example because of an uneven thermal expansion, changes in axial distance between two gearwheels with a simple helical toothing which mesh on different shafts in a transmission have a considerable influence on the load distribution to the individual planetary units arranged around a central unit.

The two gearwheels or double gearwheels of a planetary unit which are spaced apart from one another have hitherto had either a uniform straight toothing or a uniform helical toothing or double helical toothing. Only with regard to these design variants is there sufficient experience of transmission properties to which a person skilled in the art can refer.

In application of this basic knowledge, familiar to a person skilled in the art, with regard to the design of an epicyclic transmission and its effect on axial forces, power losses and load splitting, efforts have been concentrated, in the past, either on absorbing the unavoidable forces in as low-loss shaft bearings as possible and/or, for this purpose, proposing as space-saving designs as possible which are scarcely detrimental to the transmission dimensions or else on taking measures to keep axial forces as far away from the shaft bearings as possible, that is to say to compensate such axial forces, and consequently to make it unnecessary to have bearings which are technically complicated and nevertheless mostly susceptible to repair.

An example of endeavors in the former case is DE 199 17 605 A1. This relates to a transmission capable of being plugged onto a drive shaft and having a multistep planet arrangement. Force input or torque input takes place via an internally toothed ringwheel to a first planet step with a shaft fixed with respect to the transmission case. On the basis of these technical stipulations, the inventive teaching there relates to a space-saving bearing configuration for the input shaft, including the ringwheel attached nonpositively and/or positively on the latter.

Of the multiplicity of known publications with measures for force compensation and/or load distribution in epicyclic transmissions, the following are outlined representatively.

To limit the noncompensated axial forces on the drive shaft and output shaft of a transmission and in order to keep the mounting of the individual planetary units of a multistep planet as free of axial forces as possible, the patent specification DE 4017226 A1 proposes the design of a transmission with at least three planetary units distributed uniformally over the circumference, the gearwheels of a planetary unit, which are commonly designed as double split wheels, being connected to one another via an axially elastic clutch. This already technically complicated design additionally requires an axially elastic connecting clutch for the drive shaft and/or output shaft, since the distance between the two shafts varies, depending on the unavoidably variable position of the gearwheels with respect to one another, and, on the other hand, the transmission is not free of axial forces relative to the outside. The enormous outlay involved in two double helical toothings in combination with the large number of elastic clutches is economically justifiable, at most, in power-split stationary transmissions with outer ringwheel and/or at high circumferential speeds.

DE 39 23 430 C2 describes a spur wheel with a double helical toothing, having a herringbone toothing, for an epicyclic transmission with an individual planetary unit, said spur wheel being designed for simpler manufacture than two individual wheels or half wheels with an opposite, but equal helics angle. The two half wheels are connected to one another fixedly in terms of rotation and with profile conformity in one specific operation. This takes place with the aid of a pressure oil connection at the connecting press fit of the two half wheels which can thereby be adjusted by being rotated onto a common midplane. The result is a setting of the symmetry of two gearwheel halves with a high structural outlay in technical terms. The object of a uniform load distribution to various planetary units does not arise because of a lack of a plurality of planetary units.

DE 199 61 695 A1 relates to an epicyclic transmission, as above without load distribution to a plurality of planetary units, with a fixedly mounted fixed wheel which has a double helical toothing and which meshes with a correspondingly toothed loose wheel, the teeth of each of the two part regions of the double helical toothing having different helics angles in such a way that the resultant axial force components built up in a controlled manner during the meshing of these double gearwheels corresponds to that which acts in the opposite direction and which is introduced into the transmission via the loose wheel of the output shaft, for example in the case of an only single helical toothing of the second gearwheel rotating together with the loose wheel on the same shaft. In practice, however, this compensation can only ensure that the loose wheel shaft is free of axial forces relative to the outside and that the two double helical toothings are centered with respect to one another and are subjected to equal stress. The additional difficulty for force compensation, namely that of a uniform load distribution to a plurality of planetary units, does not arise.

SUMMARY OF THE INVENTION

The object on which the invention is based is, therefore, to propose a method and a multistep epicyclic transmission suitable for this, which allows a low-loss and low-noise transfer of a torque introduced at a low shaft rotational speed to a preferably co-axially oriented output shaft with high rotational speed, as compared with the input shaft, and which does not have or as far as possible prevents the disadvantages of the method and transmission designs described above. The object, therefore, is to find an economical method and cost-effective structural devices for the as far as possible complete compensation of axial forces in a load-split or power-split transmission with a uniform load distribution to the individual planetary units.

This initially mentioned object is achieved, according to the invention, by means of a method according to the characterizing features of the method claims. A transmission suitable for this has the features of the device claims.

Individual preferred embodiments of the method are described in the subclaims.

Preferred embodiments of epicyclic transmissions for carrying out the method are reproduced in FIGS. 1a and 1b.

DESCRIPTION OF THE PREFERRED EMBODIMENTS

Figure 1A:
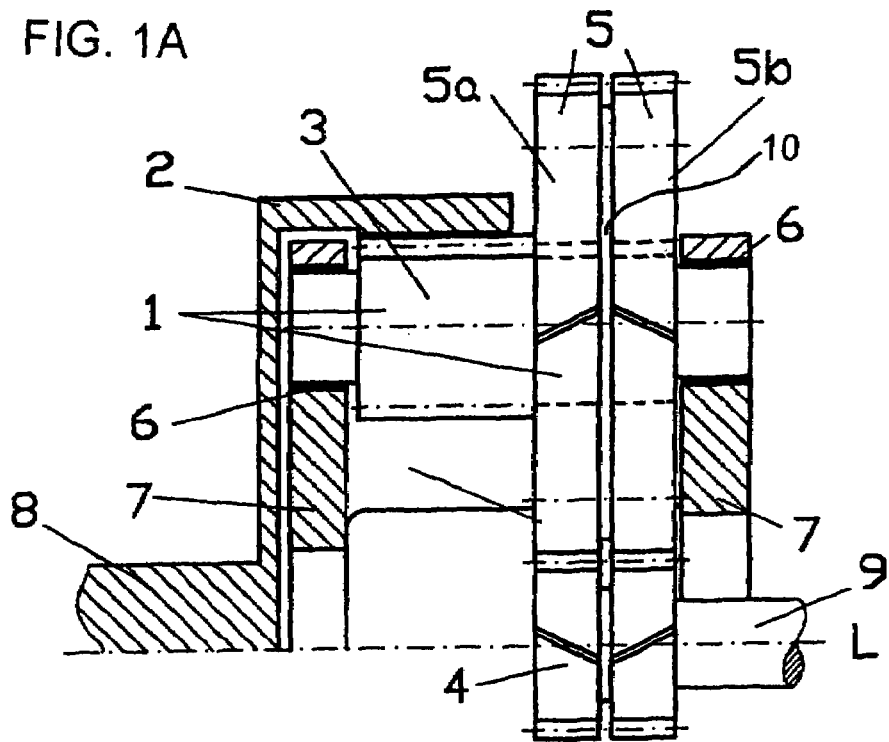
FIG. 1a illustrates a part region of the transmission according to the invention as a section through the shaft center point of the co-axial drive shaft and output shaft. In this version, the gearwheels of a planetary unit are arranged between the two shaft bearings in the planet carrier.

FIG. 1a shows an epicyclic transmission constructed axially symmetrically about the axis (L) and having a co-axial input shaft (8) and output shaft (9) in a sectional plane such that one of a plurality of planetary units (1) arranged around the sun pinion (4) of the output shaft (9) is illustrated. The planetary unit (1) is mounted in a planet carrier (7) fixedly in the radial direction and movably in the axial direction by means of two bearings (6) and possesses a double gearwheel (5) constructed from two half wheels (5a) (5b) and a straight-toothed gearwheel (3). The opposite helical toothing in the half wheels (5a) and (5b) is indicated. The half wheels are designed to be spaced apart from one another. It was decided to dispense completely with showing one of the many devices which are familiar to a person skilled in the art and by means of which, in each planetary unit, the second half wheel can be adjusted and subsequently locked with respect to the first half wheel in the axial direction and/or by rotation relative to one another about the axis. Individual design variants for devices of this type are described further below. The sun pinion (4) with helical toothing corresponding to the double gearwheel (5) is designed, on the output shaft (9), as a positively connected and/or materially integral gearwheel unit.

The ringwheel (2) is designed as a positively connected and/or materially integral unit with the drive shaft (8).

Figure 1B:
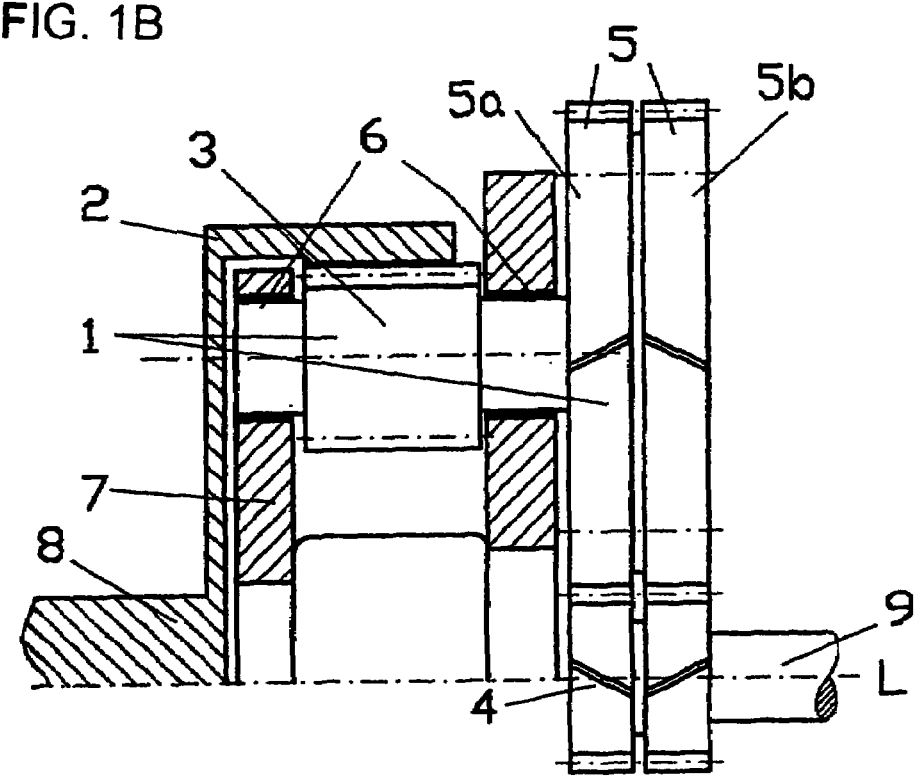
FIG. 1b shows a transmission according to the invention in an illustration identical to that of FIG. 1a, but with one of the two gearwheels or double gearwheels being arranged outside the two shaft bearings, that is to say with an overhung arrangement of the double gearwheel with respect to the local position of the bearings on the planet shaft.

In FIG. 1b, as the only difference from FIG. 1a, the planet shaft of a planetary unit is mounted in the planet carrier (7) with an overhung arrangement of the double gearwheel (5), specifically with free axial movability between the planet shaft and bearing (6).

For a person skilled in the art, it has hitherto been the unquestioned means of choice in epicyclic transmissions in which the torque introduction into a planetary unit takes place via a ringwheel, to design the meshing gearwheels with helical toothings for reasons of noise reduction and vibration reduction.

Surprisingly, according to the invention, these planetary gearwheels meshing with the ringwheel can be designed with straight toothing without disadvantages for the properties of noise and of vibration. One explanation of this would seem to be the combination of both a low rotational speed of the input shaft and a high degree of profile overlap in the tooth engagement of a ringwheel with the planetary gearwheels of all the planetary units according to the invention. It is conducive or even indispensable for these favorable noise properties to have simultaneously the design, essential to the invention, of a double helical toothing and, further, the adjustability according to the invention of the half wheels of the double gearwheel of all the planetary units which mesh with the sun pinion. The advantage which arises is especially appreciable, because, in the case of the sun pinion, there is a state in which there is a low degree of profile overlap and which is unfavorable for noise generation.

In the design of the sun pinion, it is absolutely essential for it to be configured with a helical or double helical toothing. On the one hand, in the case of the sun pinion, the tooth circumferential speed is markedly higher, as compared with that during the tooth engagement of the ringwheel with the planetary gearwheel, specifically by the amount of the ratio of the rolling circles of the two identically rotating gearwheels of a planetary unit, and, on the other hand, the profile overlap is low here, as compared with the situation during the tooth engagement between the ringwheel and multistep planet, since, in the case of the sun pinion, there is an external gearwheel with a regularly large difference in number of teeth in relation to the meshing gearwheel of the planetary unit. Purely with regard to noise generation, the double helical toothing is equivalent to the single helical toothing of comparable construction width.

The axial positioning of the planetary units (1) and sun pinion (4) in relation to one another is determined either by a fixed mounting of the sun pinion (4) or else by the fixed mounting of only one of a plurality of planetary units (1), this being in conjunction with the adjustment of the half wheels of the remaining planetary units.

The orientation or adjustment of the two half wheels (5a, 5b) of the double gearwheel takes place in the form of a relative rotation and/or by means of an axial displacement of the half wheels with respect to one another.

According to a preferred embodiment of the invention, the two half wheels are screwed together frictionally. The screw shanks have play in the passenger bores. The tooth pitch position of the two half wheels is adjusted as a result of the relative rotation of the latter within the play of the screw shanks in the passenger bores.

Any change in axial distance between the half wheels means at the same time a relative rotation of the tooth positions with respect to one another. According to a further preferred embodiment of the invention, adjustment by means of an axial displacement of the half wheels (5a, 5b) with respect to one another takes place by the insertion of adjusting plates 10 between the half wheels on the planet shaft in order to achieve a uniform bearing contact of the tooth flanks of the two half wheels.

The possibility of adjustment by means of corresponding elements and devices performs a further advantage. It allows a less exact and therefore more cost-effective manufacture of the individual transmission gearwheels and components. This all the more so when the two adjusting methods described above are combined.

The adjustment of the two half wheels (5a, 5b) of the double gearwheel of a planetary unit with respect to one another must lie within the range of the pitch accuracy of the gearwheels themselves, in order, in the case of a plurality of planetary units (1), to achieve a uniform load distribution to the individual units. Adjustment takes place during assembly, specifically, depending on the prevailing conditions, on the already installed planetary unit or outside the transmission on an adjusting device provided for this purpose and simulating the planet carrier. The latter alternative, however, entails the checking of uniform tooth carrying in the transmission. The change, regularly accompanying the adjustment, in the axial position of a planetary unit (1) with respect to the ringwheel (2), in the case of the axially retained sun pinion (4), does not cause any disturbance, however, since the straight toothing of the planetary gearwheel (3) which is in engagement with the ringwheel (2) does not give rise, during an axial or longitudinal displacement of these two gearwheel units on a shaft in relation to one another, to any change in angle of rotation with respect to one another, in contrast to the situation where the helical toothing is used. Once the tooth engagement positions of the individual planetary units have been adjusted in terms of optimum force distribution, a change in length of the shaft between the gearwheels of an individual planetary unit, but also between those of different planetary units, does not lead to any change in the load distribution to the individual tooth contacts. Also, in the design of the features of the invention, the position of the tooth pitch of the first half wheel (5a) of the double gearwheel (5) has to be assigned to that of the gearwheel (3) with a straight toothing only to an extent such that there is no axial run-on of gearwheels during operation and that all the gearwheels carry over their entire width. In order to ensure this, according to known transmission configurations, one of the gearwheels meshing in each case is designed to be wider than the other, and the half wheels of the double gearwheel are not laid directly against one another, but possess an axial gap between one another.

In the overhung arrangement of the double helical toothing according to FIG. 1b, a mounting, including adjustment, of the double helical toothing is still possible in a comparatively simple way. An arrangement with the mounting of a planet shaft on both sides outside the gearwheels, according to FIG. 1a, may, inter alia in the case of a small diameter of the double gearwheel, make it markedly more difficult to carry out mounting and subsequent adjustment in the transmission. Consequently, according to a further preferred version, the transmission according to the invention may possess a divided planet carrier (7) such that the planetary units already preadjusted outside the transmission can be introduced into the bearings (6) in the planet carrier (7) in each case radially with respect to the planet shaft, for a trial mounting and checking of the tooth position in relation to the already installed and adjusted planetary units and for further removal and readjustment.

In a preferred embodiment for carrying out the method according to the invention, the planet shaft is configured in its profile according to the straight-toothed planetary gearwheel. This profile form is continued over the width of tooth engagement with the ringwheel and, there, when shortened tooth tips, and the half wheels of the double gearwheel are plugged with a geometrically corresponding inner profile onto the planet shaft thus toothed and are adjusted and locked. The adjustment of the half wheels in this case takes place solely by the variation and co-ordination of the axial distance between the two half wheels of the double gearwheel.

The method according to the invention can be used, in particular, in epicyclic transmissions for wind power plants, but is not restricted to this application.

In a way which can easily be understood by a person skilled in the art, identical actions and advantages can be achieved when the drive shaft and output shaft are interchanged in their function, that is to say when a torque is introduced with a high shaft rotational speed into the output shaft now serving as a drive shaft and is taken off with a low shaft rotational speed via the previous drive shaft, now the output shaft. The latter form of torque transfer is a likewise preferred embodiment of the present invention.

We claim:

1. A method of mounting gears for transfer of an introduction torque introduced into a transmission at a comparatively low shaft rotational speed to an output shaft of comparatively high rotational speed in a single-step epicyclic transmission with a plurality of planetary units, the method which comprises:

transferring the introduction torque via an internally straight-toothed ringwheel to a plurality of two to six planetary units fixedly mounted radially with respect to one another in a planet carrier and to an oppositely helix-toothed sun pinion of the output shaft;

rigidly connecting a straight-toothed planetary gearwheel meshing with the ringwheel and one of two oppositely helix-toothed half wheels of a double gearwheel, meshing with the sun pinion, of each planetary unit to one another on a planet shaft; and assembling individual planetary units into bearings of the planet carrier, and thereby placing a respective second half wheel relative to the first half wheel, by way of devices for axial and/or rotational displacement, into a position of predetermined tooth carrying and load distribution between the individual planetary units and locking the second half wheel in the position.

2. The method for torque transfer according to claim 1, which comprises effecting the axial and/or rotational displacement of the second half wheel successively on each of the individual planetary units.

3. The method for torque transfer according to claim 1, which comprises assigning the position of the first half wheel of the double gearwheel to the second half wheel of the double gearwheel by rotating the first and second half wheels relative to one another.

4. The method for torque transfer according to claim 1, which comprises assigning the position of the first half wheel of the double gearwheel to the second half wheel of the double gearwheel by axially displacing the first and second half wheels relative to one another.

5. The method for torque transfer according to claim 1, which comprises, following a position assignment, connecting the second half wheel to the planet shaft and/or to the first half wheel and locking the second half wheel in that position.

6. The method for torque transfer according to claim 5, which comprises using a force-locking connection for connecting the second half wheel to the planet shaft and/or to the first half wheel.

7. The method for torque transfer according to claim 5, which comprises using a form-locking connection for connecting the second half wheel to the planet shaft and/or to the first half wheel.

8. The method for torque transfer according to claim 1, which comprises locking the second half wheel axially resiliently with respect to the first half wheel.

9. The method for torque transfer according to claim 1, which comprises using a toothing profile of the straight-toothed planetary gearwheel, with a tip thereof shortened, as a shaft profile for the axial guidance of one or of both half wheels by way of a corresponding inner profile on the shaft.

10. The method for torque transfer according to claims 1, which comprises adjusting the second half wheel in axial direction with respect to the first half wheel by inserting adjusting plates between the first and second half wheels.

11. The method for torque transfer according to claims 1, which comprises introducing the planetary units into bearing points in a divided planet carrier radially with respect to an axial direction of the planet shaft.

12. A single-step epicyclic transmission for transferring a torque introduced at a comparatively low rotational speed onto an input shaft to a sun pinion of an output shaft with a comparatively high rotational speed, comprising:

a planet carrier;

a plurality of planetary units mounted radially fixed with respect to one another on said planet carrier;

an oppositely helix-toothed double gearwheel formed with two half wheels;

each planetary unit having a planet shaft and a straight-toothed planetary gearwheel fixedly connected to said two half wheels, said straight-toothed planetary gearwheel meshing with a ringwheel connected fixedly to the input shaft and having an internal straight toothing;

each planetary unit including devices configured, during mounting of individual said planetary units in said planet carrier, to orient said second half wheel, for uniform load distribution to all said planetary units, with respect to said first half wheel in an axial direction and/or by rotation about the planet shaft and to lock said second half wheel.

13. The transmission according to claim 12, wherein said plurality of planetary units include two to six planetary units.

* * * * *